United States Patent [19]
Redin

[11] 3,797,361
[45] Mar. 19, 1974

[54] METHOD AND MACHINE FOR TOPPING GEAR

[76] Inventor: Clifton W. Redin, c/o Redino Production Machine Co., 2433 20th St., Rockford, Ill. 61101

[22] Filed: Aug. 1, 1972

[21] Appl. No.: 276,977

[52] U.S. Cl. .................................. 90/1.4, 90/1.6 R
[51] Int. Cl. .................................... B23f 19/10
[58] Field of Search ........................ 90/1.4, 1.6 R

[56] References Cited
UNITED STATES PATENTS
2,772,602  12/1956  Cheistman ............................ 90/1.4
2,078,124  4/1937  Condon ................................ 90/1.4

Primary Examiner—Andrew R. Juhasz
Assistant Examiner—Z. R. Bilinsky
Attorney, Agent, or Firm—Wolfe, Hubbard, Leydig, Voit & Osann, Ltd.

[57] ABSTRACT

A cutter swings in an arc within a vertical plane and shaves metal from the top edges of a curved tooth gear, the gear being uniquely positioned to enable each curved edge to be presented to a topping position in which the edge approximates both the plane and the arc of swinging of the cutter. The cutter is supported for controlled floating and is spring-urged against the curved edges to conform to the latter and effect a cut of substantially uniform depth.

9 Claims, 9 Drawing Figures

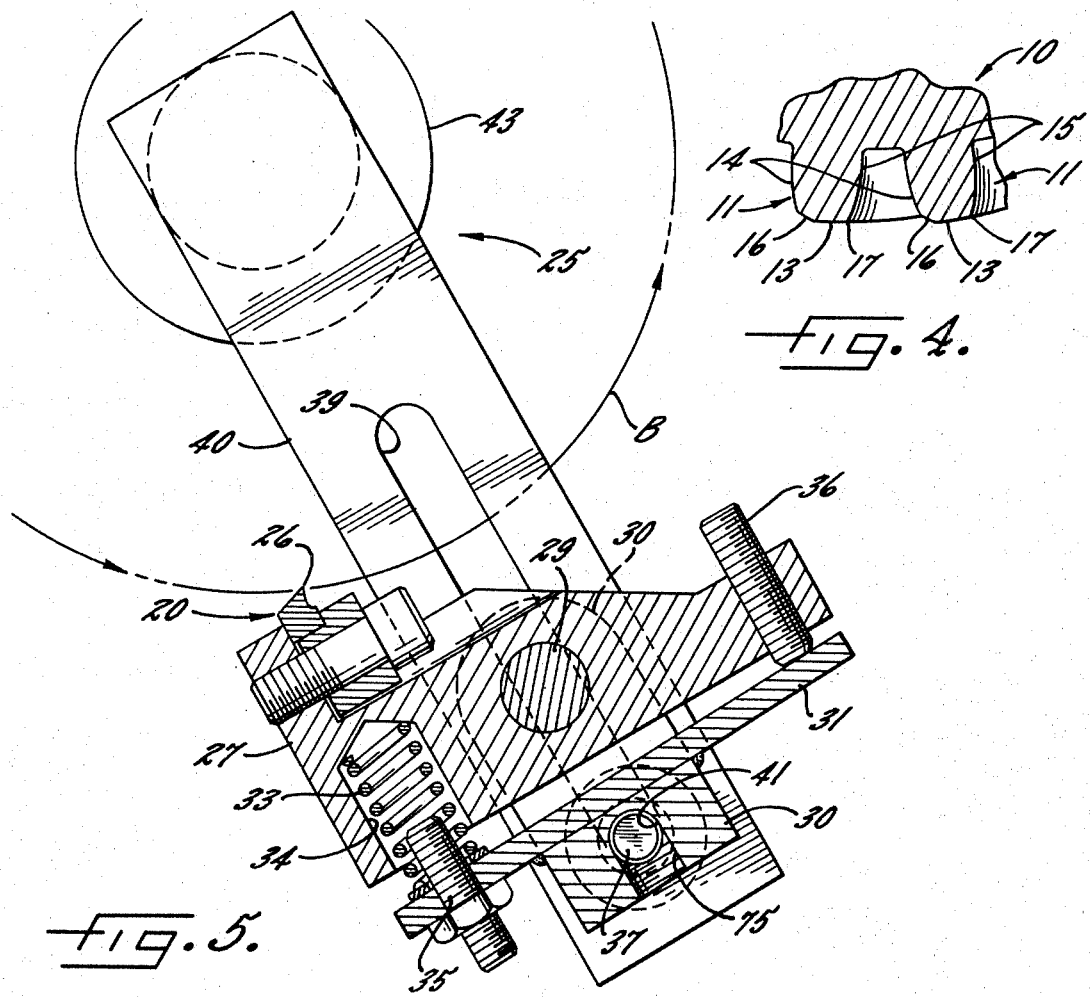
fig. 4.
fig. 5.
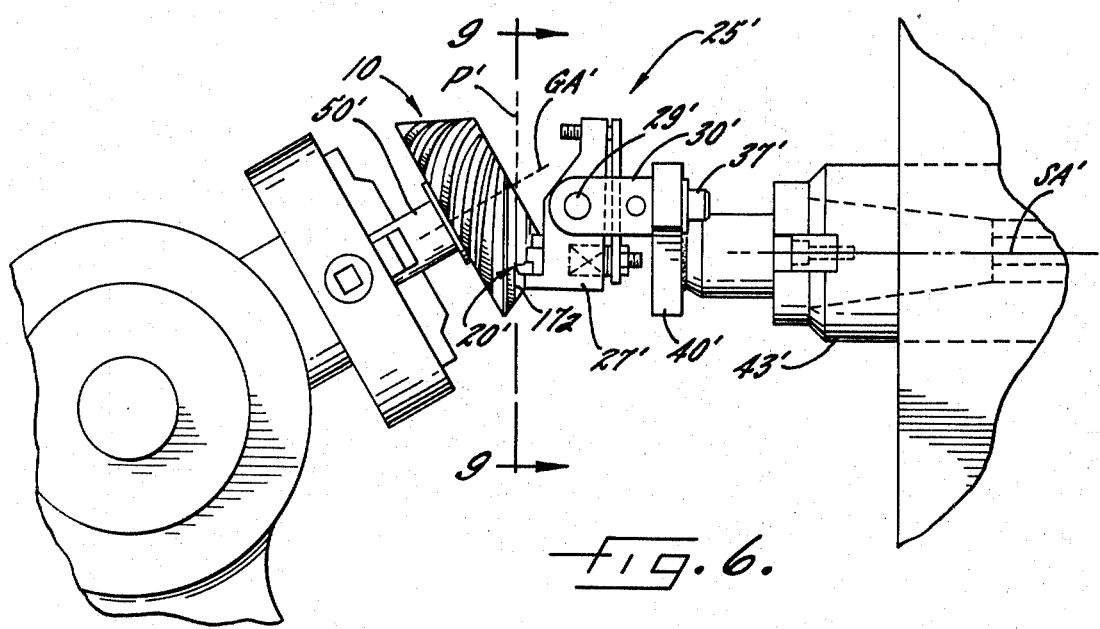
fig. 6.

METHOD AND MACHINE FOR TOPPING GEAR

BACKGROUND OF THE INVENTION

This invention relates to the deburring and chamfering of the teeth of curved toothed gears such as, for example, spiral bevel gears. More particularly, the invention relates to the deburring and chamfering of those edges of the teeth which extend along the width of each tooth at the junctions of the top land with the faces of the tooth. Such a deburring and chamfering operation is commonly called "topping" and is performed on newly generated gears to reduce the sharpness of the "top" edges before the gear is heat treated.

SUMMARY OF THE INVENTION

The general aim of the present invention is to provide a new and improved gear topping method and machine by which the curved top edges may be deburred and chamfered quickly and easily with the use of a relatively simple cutter adapted to shave the metal from the top edges.

More specifically, the invention contemplates topping the teeth with a cutter adapted to be swung in a predetermined plane and through an arcuate path which loops around the axis of the gear, the axis being tilted at a preselected angle relative to the plane. The gear is turned about its axis to locate the curved top edge of one tooth in a topping position in which the edge is disposed in close proximity to the plane through which the cutter swings and closely approximates the arc followed by the cutter. Accordingly, the cutter sweeps across and shaves away the top edge upon being swung past the latter and, while the cutter subsequently is looping around the gear axis, the gear is indexed to advance the corresponding edge of a following tooth into the topping position to be engaged by the cutter during its next cycle.

Importantly, the cutter is capable of floating back and forth as it is swept across the top edge and is resiliently urged into engagement with the edge so as to conform to the latter and effect a smooth cut of substantially uniform depth. When topping one edge of each tooth, the cutter floats within the plane of swinging and, when topping the opposite edge, the cutter floats in a substantially perpendicular plane so that the cutter can conform to and follow the differently shaped edges.

These and other objects and advantages of the invention will become more apparent from the following detailed description when taken in conjunction with the accompanying drawings.

BRIEF DESCRIPTION OF THE DRAWINGS

FIG. 4 is a fragmentary cross-section taken substantially along the line 4—4 of FIG. 3.

FIG. 5 is an enlarged fragmentary cross-section taken substantially along the line 5—5 of FIG. 1.

FIG. 6 is a view similar to FIG. 1 but shows a machine for topping the concavely curved edges of the gear teeth.

DETAILED DESCRIPTION

Figure 1:
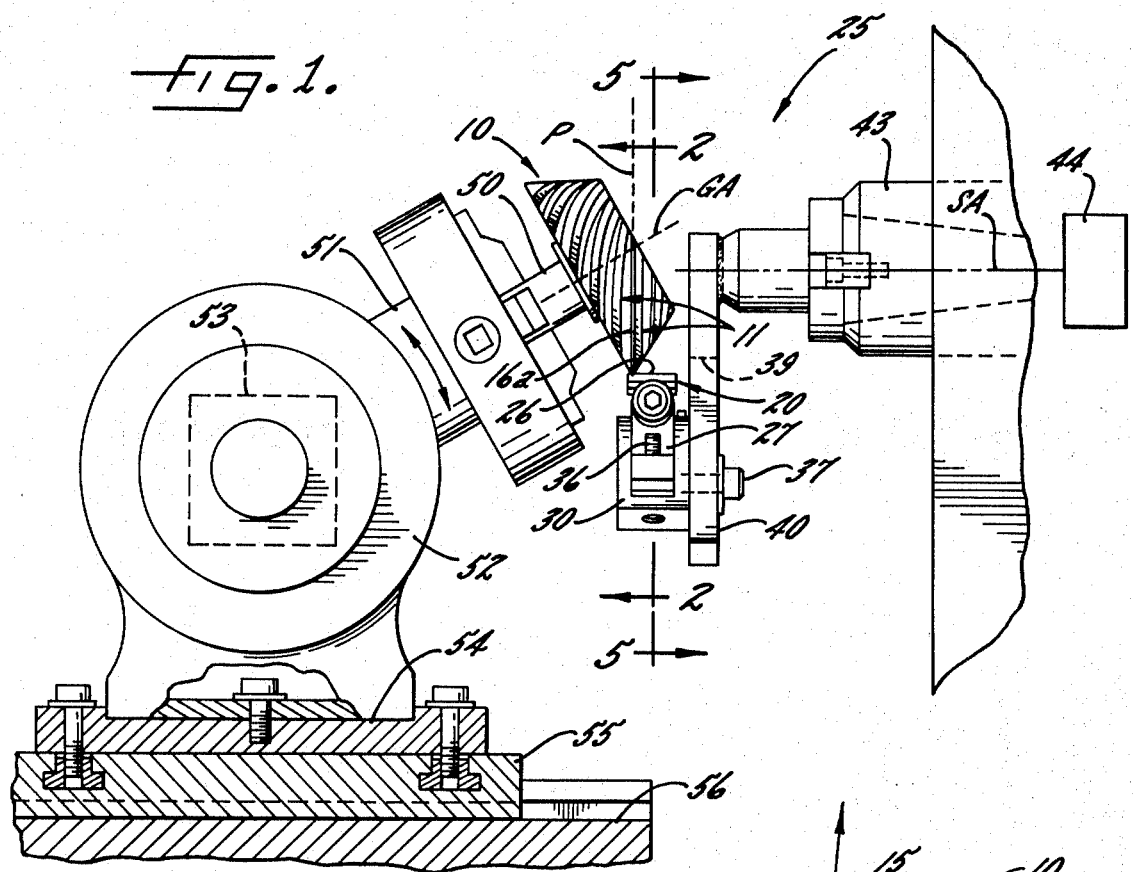
FIG. 1 is a fragmentary side elevation of an exemplary machine incorporating the novel features of the invention and capable of carrying out the unique principles of the invention with respect to the convexly curved edges of the gear teeth.

The present invention resides in a method for topping the teeth of a newly generated curved toothed gear and in a machine for carrying out the method. The invention is particularly applicable to curved toothed bevel gears such as spiral bevels, Zerol bevels, and hypoid gears and may be used in topping the teeth of both pinions and ring gears. In the present instance, the principles of the invention will be explained with reference to a hypoid pinion 10 of the type shown in FIGS. 1 to 4.

As shown, the pinion 10 is shaped as a truncated cone and is formed with a series of angularly spaced teeth 11 each spiraled a partial revolution around the cone and each having a top land 13 which lies along the surface of the cone. Each tooth further includes a convexly curved top face 14 and a concavely curved bottom face 15 located on opposite sides of the top land, both faces curving lengthwise of the tooth. In addition to the convex-concave curvature, the top land curves outwardly upon proceeding from the apex of the cone toward the base thereof since the top land follows the surface of the cone and thus becomes spaced progressively greater distances from the central axis GA of the gear.

Topping is an operation which involves deburring and chamfering the top edges 16 and 17 of each tooth 11, such edges extending along the top land 13 at the junction of the latter with the faces 14 and 15, respectively. Thus, the edge 16 is convexly curved while the edge 17 is concavely curved and both are curved outwardly in accordance with the outward curvature of the top land. By topping the edges, the sharpness of the edges is reduced and the edges are less brittle and possess greater strength when subsequently hardened by heat treating.

In accordance with the present invention, the edges 16 and 17 are topped in a rapid manner by a comparatively simple cutter 20 adapted to swing in an arcuate path past the edges to shave metal therefrom and capable of conforming to the complex curvature of the edges to produce a substantially uniform cut along the edges. To enable topping of the complexly curved edges by the swinging cutter, the gear 10 is uniquely positioned relative to the cutter such that each edge may be located in a topping position in which such edge is disposed in close proximity to the plane of swinging of the cutter and extends substantially along the arc in which the cutter travels.

Figure 7:
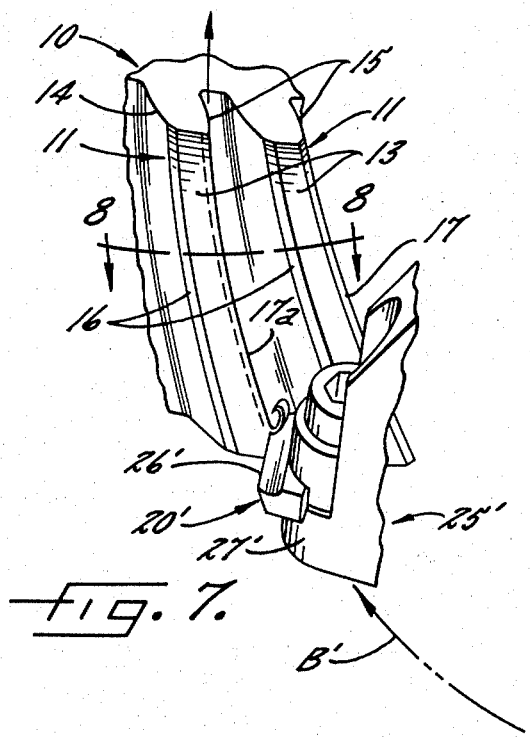
FIG. 7 is a perspective view showing the cutter illustrated in FIG. 6 topping the concavely curved edge of one of the gear teeth.
Figure 8:
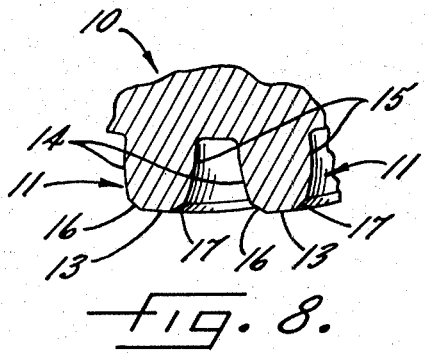
FIG. 8 is a fragmentary cross-section taken substantially along the line 8—8 of FIG. 7.
Figure 9:
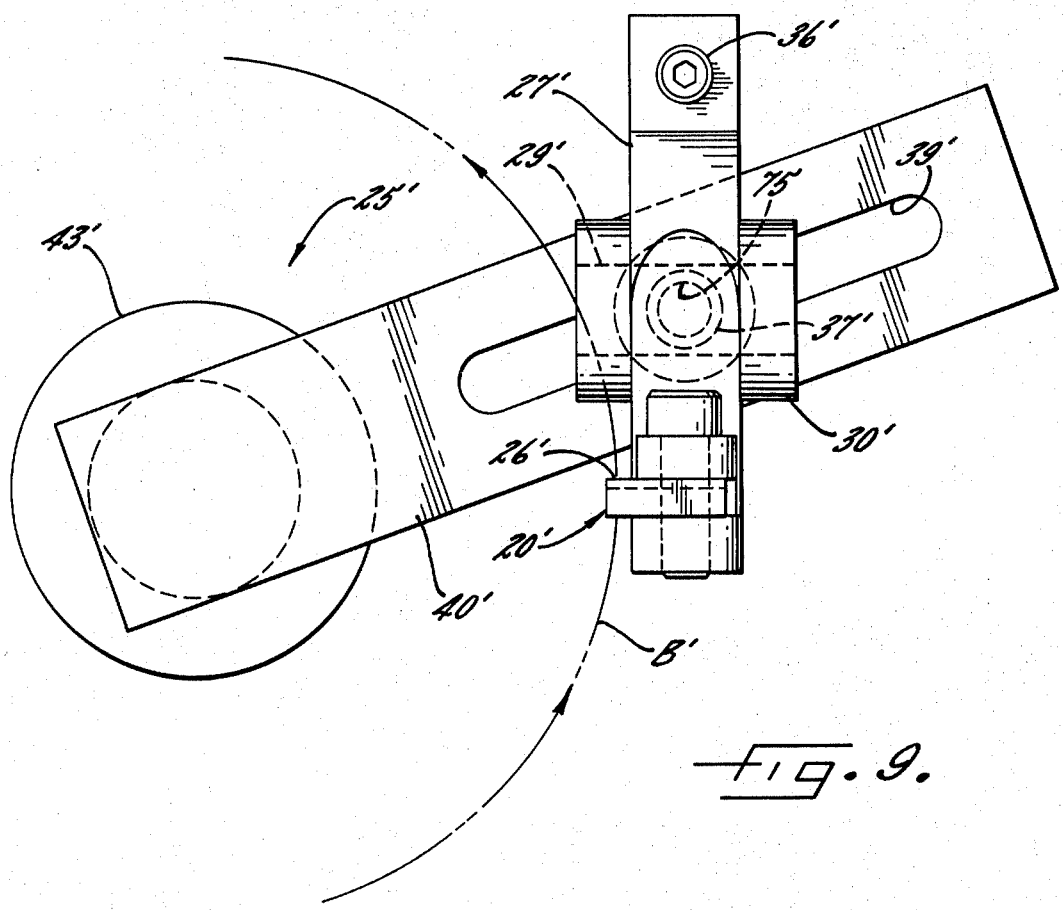
FIG. 9 is an enlarged fragmentary cross-section taken substantially along the line 9—9 of FIG. 6.

It is well within the scope of the invention to simultaneously top both edges 16 and 17 of one or more teeth 11, to top the convex edge 16 of one tooth while at the same time topping the concave edge 17 of another tooth, or to top either the convex or concave edge of one tooth while simultaneously topping the corresponding edge of another tooth. For simplicity, however, and to most easily explain the basic principles of the invention, the latter will be described in conjunction with a topping operation in which the convex edges 16 are each separately topped by one machine 25 (FIGS. 1 to 3 and 5) while the concave edges 17 are each separately topped by a second machine 25' (FIGS. 6, 7 and 9).

Figure 3:
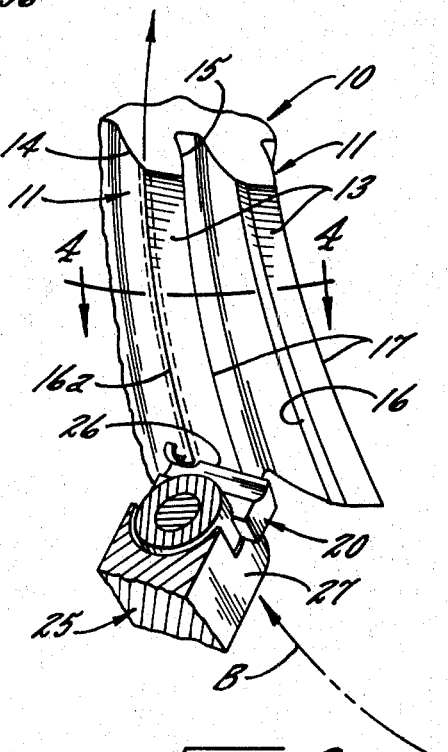
FIG. 3 is a perspective view showing the cutter illustrated in FIGS. 1 and 2 topping the convexly curved edge of one of the gear teeth.

More specifically, the cutter 20 of the first machine 25 comprises a single point tool bit with a sharpened cutting edge 26 (FIGS. 3 and 5). The cutter is anchored removably in a block-like holder 27 (FIG. 5) which, in turn, is mounted on a pivot pin 29 extending through a cutter support yoke 30, there being a plate 31 extending transversely between the legs of the yoke and welded to the bight thereof. For an important purpose to be described subsequently, the cutter holder is pivoted on the pin 29 and, in addition, the cutter is resiliently urged about the pin and away from the plate 31 by a coiled compression spring 33 telescoped into a hole 34 in one end portion of the holder and bearing against a compression adjusting screw 35 threaded in the corresponding end portion of the plate. A screw 36 extending through the opposite end portion of the holder engages the plate and may be adjusted to change the extent to which the cutter projects away from the plate.

In the machine 25, a screw 37 (FIGS. 1 and 5) extends through an elongated slot 39 in an arm 40 and is threaded into a hole 41 in one of the legs of the yoke 30. The arm 40 is connected to turn with a horizontally projecting spindle 43 (FIG. 1) and extends radially therefrom, the spindle being power rotated by conventional drive means shown schematically in FIG. 1 and indicated by the reference numeral 44. With this set up, the cutting edge 26 and the pin 29 extend parallel to the spindle 43 of the machine 25 as shown in FIG. 5 and may be adjusted radially and angularly with respect to the spindle by loosening the screw 37 and sliding and turning the yoke 30 relative to the arm 40. When the spindle is rotated, the cutter 20 is swung in an arcuate path B (FIG. 2) around the spindle and swings in a vertical plane P (FIGS. 1 and 2) disposed perpendicular to the axis SA of the spindle.

In keeping with the invention, the gear 10 is supported such that its convex edges 16 can be located sequentially in a topping position in which each edge is disposed in close proximity to the plane P in which the cutter 20 swings and approximates the arc B of travel of the cutter. For this purpose, the gear is supported on a work spindle 50 (FIG. 1) whose axis coincides with the central axis GA of the gear, the spindle being indexable through predetermined and adjustable increments and in timed relation with the rotation of the spindle 43 by conventional mechanism shown schematically and indicated by the reference numeral 53. As shown in FIG. 1, the gear spindle is journaled in a head 51 adapted to be pivoted upwardly and downwardly about a horizontal axis on a swivel base 52 which, in turn, is adapted to pivot about a vertical axis on an upper slide 54. The latter may be moved in a horizontal path extending perpendicular to the cutter spindle 43 on a lower slide 55 which is supported on an underlying bed 56 to move toward and away from the cutter spindle.

Figure 2:
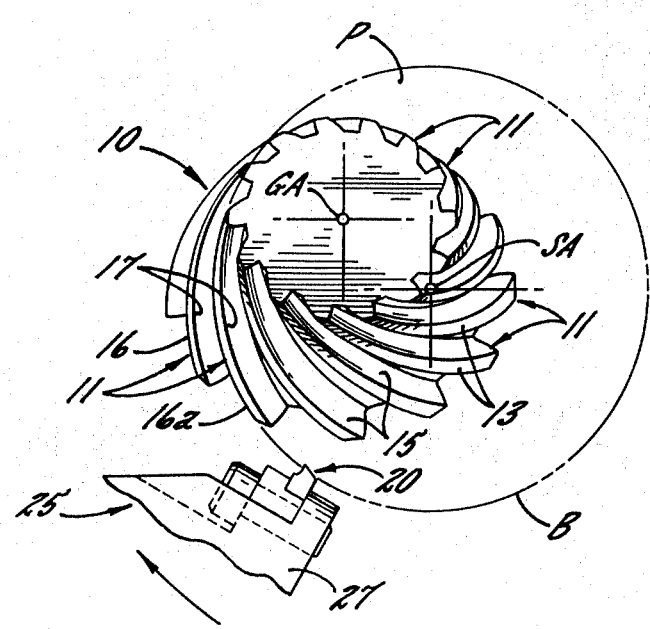
FIG. 2 is a view of the gear and the cutter as taken substantially along the line 2—2 of FIG. 1.

To set up the machine 25, the swivel base 52 and the slides 54 and 55 are located so as to position the gear spindle 50 in a plane extending parallel to the cutter spindle 43 and offset radially from the cutter spindle by a preselected distance determined by the characteristics of the gear 10 (e.g., its diameter and the spiral angle of the teeth 11). The head 51 then is pivoted on the base 52 to tilt the gear spindle 50 upwardly at a preselected angle, the value of which again is determined by the gear characteristics. FIG. 2 shows the radial offset between the gear axis GA and the cutter spindle axis SA while FIG. 1 shows the gear axis tilted upwardly relative to the cutter spindle axis.

With the gear spindle 50 tilted upwardly at the proper angle, the gear 10 may be turned about the axis of the spindle until the convex edge 16a of one tooth 11 is in very close proximity to the same plane P through which the cutter 20 swings. That is to say, the convex edge 16a of the tooth 11 can, in effect, be flattened out and can be made to lie almost exactly in the plane P by turning the gear about the tilted spindle 50 until the edge moves around into the plane (see FIG. 1). When thus disposed, the edge 16a may be considered as being located in the topping position and may be chamfered by the cutter 20 as the latter is swept upwardly through its arc B about the axis SA of the cutter spindle 43.

By adjusting the cutter holder 27 along the arm 40, the upwardly extending arc followed by the cutting edge 26 may be made to coincide quite closely with the outward curvature of the convex edge 16a of the tooth 11 in the topping position (see FIG. 2). In order to compensate for any difference between the curvature of the arc B and the outward curvature of the convex edge 16a, the holder 27 is adjusted so as to insure that the cutting edge 26 will engage the convex edge at every point along the entire length of the convex edge. Then, upon being swept across the convex edge, the cutter floats or rocks outwardly about the pivot pin 29 and against the bias of the spring 33. Accordingly, the cutting edge 26 is spring-loaded against the convex edge and is capable of floating outwardly to automatically accommodate any variations between the arc followed by the cutting edge and the outward curvature of the convex edge.

With the foregoing arrangement, topping of the convex edge 16a in the topping station is effected simply by rotating the spindle 43 and, as the cutter swings through its upwardly extending arc, it sweeps smoothly across the convex edge since the latter is disposed very nearly in the same plane and arc in which the cutter swings and since the cutter may float about the horizontally disposed pin 29 in order to conform to the outward curvature of the convex edge. As a result, a smooth chamfer of substantially uniform depth is formed along the convex edge (see FIG. 3).

After the cutter 20 has swept past the convex edge 16a, rotation of the spindle 43 is continued to cause the cutter to swing above the gear 10 and then downwardly along the opposite side of the gear as shown in FIG. 2. Because the spindles 43 and 50 are offset radially, the cutter loops around the gear without touching the latter as the cutter swings downwardly. During this time, the gear spindle 50 is indexed to advance the chamfered edge 16a out of the topping position and to advance the convex edge 16 of the following tooth 11 into the topping position so that such edge may be chamfered on the next upward sweep of the cutter. Accordingly, the topping operation can be carried out at a relatively rapid rate since the cutter does not reversely trace the chamfered tooth as the cutter returns to cutting position but instead loops around and clears the gear to enable indexing of the latter during such return.

Indexing of the gear 10 and swinging of the cutter 20 may be continued until the convex edges 16 of all of the teeth 11 have been chamfered. In the arrangement which has been disclosed for purposes of simplicity, the gear then is removed from the machine 25 and is transferred to the machine 25' shown in FIGS. 6, 7 and 9 for topping of the concave edges 17.

The machine 25' is identical to the machine 25 except with respect to the mounting of the cutter holder 27' on the arm 40'. In the case of the machine 25', the holder is connected to the arm by a screw 37' which extends through a hole 75 (FIG. 9) in the bight of the yoke 30' rather than through the hole in the leg of the yoke. As a result, the axis of the pivot pin 29' (FIG. 6) extends transversely of the axis SA' of the cutter spindle 43' and the cutter 20' floats into and out of the plane of swinging rather than floating within such plane. By floating in this manner, the cutting edge 26' can best conform to the curvature of the concave edges 17.

Topping of the concavely curved edges 17 is effected in a manner similar to that by which the convex edges 16 are topped. That is, the machine 25' is set up with the gear axis GA' tilted upwardly toward the cutter spindle axis SA' and offset radially therefrom and with the gear 10 turned to a predetermined angular position about the gear spindle 50'. By properly positioning the gear, one concave edge 17a (FIGS. 6 and 7) may be "flattened out" and made to lie very nearly in the vertical plane P' (FIG. 6) through which the cutter swings. By adjusting the cutter holder 27' to a given position along the arm 40', the arcuate path followed by the cutting edge 26' during its upward travel will approximate the outward curvature of the concave edge 17a and the cutting edge will clear all of the remaining portions of the gear.

Thus, as the cutter 20' is swung upwardly, the cutting edge 26' engages the concave edge 17a in the topping position and shaves the metal therefrom (see FIGS. 6 and 7), the cutter floating about the pin 29' and being spring-urged against the concave edge to effect a uniform cut. Just after the cutter has cleared the concave edge 17a, the gear 10 is indexed to advance the next concave edge 17 to the topping position while the cutter is looping downwardly around the gear preparatory to the next cutting stroke.

From the foregoing, it will be apparent that the present invention brings to the art new and improved gear topping techniques in which the metal is shaved from the top edges by a comparatively simple cutter capable of effecting a substantially uniform cut. Because indexing of the gear advantageously takes place while the cutter is looping idly around the gear, the topping operation can be carried out at rapid rates as compared with prior operations in which the topped edge is reversely traced by the topping tool.

I claim as my invention:

1. A method of topping the teeth of a curved tooth gear, said method comprising the steps of, supporting said gear to turn about a first predetermined axis coinciding with the axis of the gear and positioning said gear angularly about said axis to locate one edge of one tooth in a stationary topping position in which said one edge is disposed in close proximity to a predetermined plane, said one edge being the edge extending along the width of said tooth at the junction of the top land of the tooth with one of the faces of the tooth, supporting a cutter to swing within said plane and about a second predetermined axis disposed at a preselected angle relative to said first axis, swinging said cutter in one direction about said second axis to sweep the cutter within said plane and along said one edge to remove material from said one edge while the latter is stationary in said topping position, indexing said gear a preselected distance about said first axis after said cutter has swept past said one edge thereby to advance the corresponding edge of a following tooth into said topping position, and continuing to swing said cutter in said one direction around said second axis during indexing of said gear thereby to bring said cutter into position to sweep along the edge of said following tooth.

2. A method as defined in claim 1 in which said first and second axes are disposed in spaced parallel planes extending substantially perpendicular to said one plane.

3. A method of topping the teeth of a curved tooth bevel gear, said method comprising the steps of, supporting said gear to turn about a first predetermined axis coinciding with the axis of the gear and positioning said gear angularly about said axis to locate one edge of one tooth in a stationary topping position in which said one edge is disposed in close proximity to a predetermined plane, said one edge being the edge extending along the width of said tooth at the junction of the top land of the tooth with one of the faces of the tooth, supporting a cutter to swing within said plane and through an arc which curves about a second predetermined axis extending substantially perpendicular to said plane, said second axis being inclined at a preselected angle relative to said first axis and being offset from said first axis, swinging said cutter in one direction about said second axis and through said arc to sweep the cutter within said plane and along said one edge to remove material from said one edge while the latter is stationary in said topping position, floating said cutter relative to said second axis as the cutter sweeps along said edge, resiliently urging said cutter against said edge during floating of the cutter thereby to press the cutter into conformity with said edge, indexing said gear a preselected distance about said first axis after said cutter has swept past said one edge thereby to advance the corresponding edge of a following tooth into said topping position, and continuing to swing said cutter in said one direction around said second axis during indexing of said gear thereby to bring said cutter into position to sweep along the edge of said following tooth.

4. A method as defined in claim 3 in which said cutter is floated about a third axis paralleling said second axis and is resiliently urged in one direction about said third axis.

5. A method as defined in claim 3 in which said cutter is floated about a third axis extending transversely of said second axis and is resiliently urged in one direction about said third axis.

6. A machine for topping the teeth of a curved tooth bevel gear, said machine comprising means for supporting said gear for indexing about a first predetermined axis coinciding with the axis of the gear, a cutter support mounted for rotation about a second predetermined axis, a cutter mounted on said cutter support in radially spaced relation from said second axis and swingable about the latter and within a predetermined plane in response to rotation of said cutter support, said first axis being inclined relative to said second axis at a preselected angle enabling location of one edge of one tooth in a topping position when said gear is turned to a given angular position about said first axis, said one edge being disposed in close proximity to said predetermined plane when in said topping position and being defined by that edge which extends along the width of said tooth at the junction of the top land of the tooth with one of the faces of the tooth, mechanism for rotating said cutter support to swing said cutter in one direction about said second axis thereby to sweep said cutter within said plane and along said one edge to remove material therefrom, means for holding said gear stationary while said cutter is sweeping along said one edge and for indexing said gear a predetermined distance about said first axis after said cutter has swept past said one edge thereby to advance the corresponding edge of a following tooth into said topping position, and said mechanism being operable to swing said cutter in said one direction about said second axis during indexing of said gear whereby the cutter loops around the gear and into position to sweep along the edge of said following tooth.

7. A machine for topping the teeth of a curved tooth bevel gear, said machine comprising means supporting said gear for indexing about a first predetermined axis coinciding with the axis of the gear, a cutter support mounted for rotation about a second predetermined axis, a cutter located on said cutter support in radially spaced relation from said second axis and swingable about the latter and within a predetermined plane in response to rotation of said cutter support, said first and second axes being disposed in spaced parallel planes extending substantially perpendicular to said predetermined plane, said first axis being inclined relative to said second axis at a preselected angle enabling location of one edge of one tooth in a topping position when said gear is turned to a given angular position about said first axis, said one edge being disposed in close proximity to said predetermined plane when in said topping position and being defined by that edge which extends along the width of said tooth at the junction of the top land of the tooth with one of the faces of the tooth, mechanism for rotating said cutter support to swing said cutter in one direction about said second axis thereby to sweep said cutter within said plane and along said one edge to remove material therefrom, means mounting said cutter to float on said cutter support and relative to said second axis as the cutter sweeps along said edge, means acting between said cutter support and said cutter and resiliently urging the cutter against said edge during floating of the cutter thereby to press the cutter into conformity with said edge, means for holding said gear stationary while said cutter is sweeping along said one edge and for indexing said gear a predetermined distance about said first axis after said cutter has swept past said one edge thereby to advance the corresponding edge of a following tooth into said topping position, and said mechanism being operable to swing said cutter in said one direction about said second axis during indexing of said gear whereby the cutter loops around the gear and into position to sweep along the edge of said following tooth.

8. A machine as defined in claim 7 in which said mounting means comprises a pivot connected between said cutter support and said cutter and supporting said cutter to float about a third axis extending parallel to said second axis, said resilient means comprising a spring urging said cutter in one direction about said third axis.

9. A machine as defined in claim 7 in which said mounting means comprises a pivot connected between said cutter support and said cutter and supporting said cutter to float about a third axis extending transversely of said second axis, said resilient means comprising a spring urging said cutter in one direction about said third axis.

* * * * *